United States Patent
Okaue et al.

(10) Patent No.: US 8,214,540 B2
(45) Date of Patent: Jul. 3, 2012

(54) PERIPHERAL DEVICE AND DEVICE CONNECTION SYSTEM

(75) Inventors: Takumi Okaue, Kanagawa (JP); Hiroshi Kuno, Kanagawa (JP); Jun Tashiro, Kanagawa (JP); Hideaki Okubo, Saitama (JP); Takeshi Ishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/896,323

(22) Filed: Oct. 1, 2010

(65) Prior Publication Data
US 2011/0087804 A1    Apr. 14, 2011

(30) Foreign Application Priority Data
Oct. 9, 2009  (JP) ................................ 2009-235276

(51) Int. Cl.
*G06F 3/00* (2006.01)
(52) U.S. Cl. ............. 710/5; 710/105; 370/250; 370/260
(58) Field of Classification Search ........................ None
See application file for complete search history.

(56) References Cited

U.S. PATENT DOCUMENTS

| | | | |
|---|---|---|---|
| 6,942,147 B2 * | 9/2005 | Lahteenmaki et al. | 235/441 |
| 2007/0222681 A1 * | 9/2007 | Greene et al. | 343/700 MS |
| 2007/0226388 A1 * | 9/2007 | Lin | 710/104 |
| 2008/0135628 A1 | 6/2008 | Aoki et al. | |
| 2009/0013103 A1 * | 1/2009 | Chang et al. | 710/36 |

FOREIGN PATENT DOCUMENTS
JP    2008-146120    6/2008
* cited by examiner

*Primary Examiner* — Elias Mamo
(74) *Attorney, Agent, or Firm* — SNR Denton US LLP

(57) ABSTRACT

A peripheral device includes: an input/output block connected to a device subject to connection; a communication block configured to communicate with a device subject to communication; and a conversion block configured, if the device subject to communication is a storage device, to convert a storage access command output by the device subject to connection to the input/output block into a communication command that is transferred between the communication block and the device subject to communication, wherein the communication block transmits the communication command generated by the conversion block to the device subject to communication and transfers, with the device subject to communication, one of data that is written by the device subject to connection to the device subject to communication and data that is read from the device subject to communication.

13 Claims, 13 Drawing Sheets

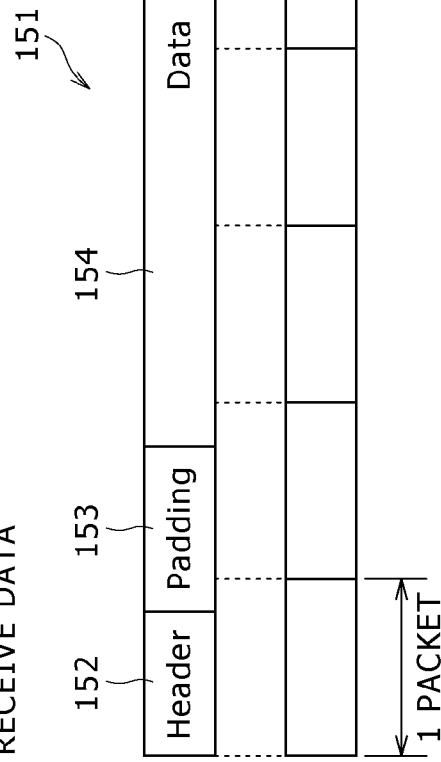
FIG.11
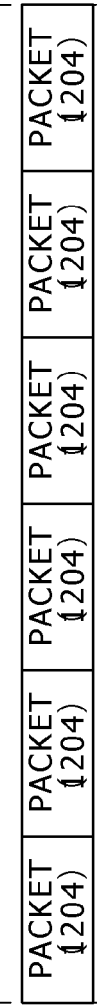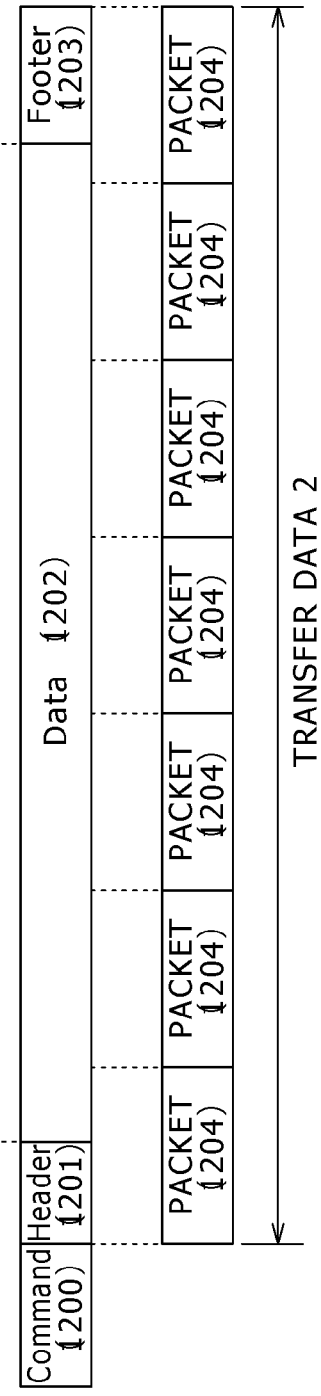
FIG.12

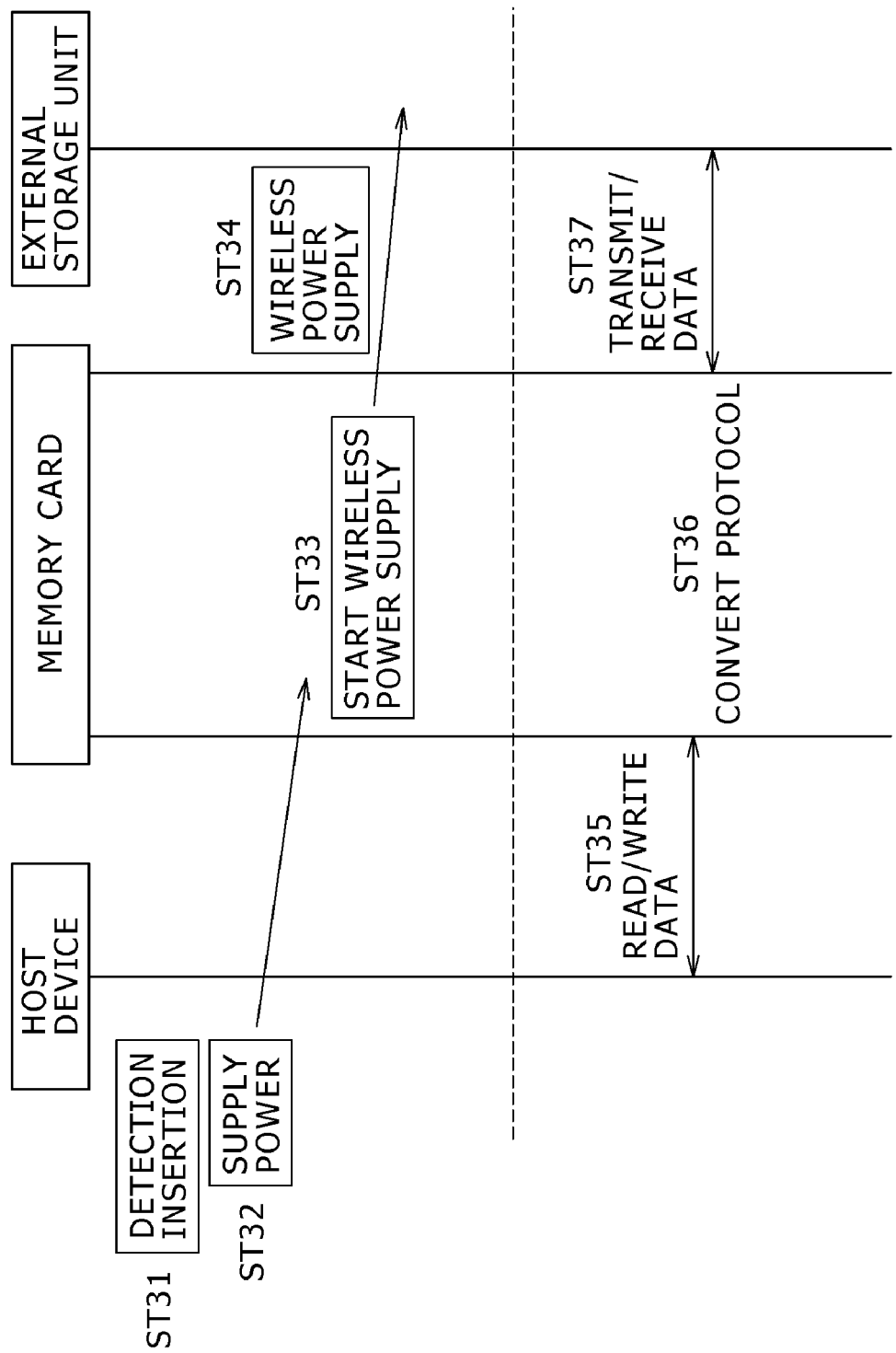

PERIPHERAL DEVICE AND DEVICE CONNECTION SYSTEM

BACKGROUND OF THE INVENTION

1. Field of the Invention

The present invention relates to a peripheral device and a device connection system that are configured, connected to a device subject to connection (or a connection mate device), to execute communication with another device subject to connection.

2. Description of the Related Art

Referring to Japanese Patent Laid-open No. 2008-164120, there is disclosed a memory card that is detachably connected to electronic devices.

SUMMARY OF THE INVENTION

The above-mentioned another device that an electronic device wants to access for getting data, for example, includes external storage units.

These external storage units are externally attached hard disk drives, for example. Some of the externally attached storage units cannot connect to electronic devices or directly communicate with electronic devices.

For example, the external storage units that were manufactured before the establishment of new communication protocols are not connectable with the electronic devices configured to operate in accordance with the newly established communication protocols.

In order for these external storage units to be connectable with electronic devices based on newly established communication protocols, the electronic devices each must have a peripheral device compliant with the newly established communication protocols and a software driver compliant with the newly established protocols must be patched to the electronic devices.

However, the specifications of some electronic devices do not permit easy patching of drivers compliant with the newly established communication protocols or do not permit such patching at all.

Patching of such drivers to electronic devices and accordingly changing the setting of electronic devices are executed by users in general.

So, in order to overcome the above-mentioned inconveniences and reduce the user load demanded for the extra jobs, it is demanded to universally facilitate the access to electronic devices subject connection and communication for getting data.

In carrying out the invention and according to one embodiment thereof, there is provided a peripheral device. This peripheral device has an input/output block connected to a device subject to connection; a communication block configured to communicate with a device subject to communication; and a conversion block configured, if the device subject to communication is a storage device, to convert a storage access command output by the device subject to connection to the input/output block into a communication command that is transferred between the communication block and the device subject to communication. In this peripheral device, the communication block transmits the communication command generated by the conversion block to the device subject to communication and transfers, with the device subject to communication, one of data that is written by the device subject to connection to the device subject to communication and data that is read from the device subject to communication.

Suitably, the conversion block converts a write request command that is output by the device subject to connection to write data into a transmit command for transmitting data from the communication block to the device subject to communication; the input/output block outputs a data request signal to the device subject to connection in accordance with inputting of the write request command and takes in write data from the device subject to connection after outputting of the data request signal; the peripheral device has a buffer memory configured to accumulate the write data entered in the input/output block; and the communication block transmits the transmit command and the write data accumulated in the buffer memory to the device subject to communication.

Suitably, the conversion block converts a read request command that is output by the device subject to connection to read data into a receive request command for the communication block to receive data from the device subject to communication; the communication block receives read data from the device subject to communication after transmitting the receive request command to the device subject to communication; the peripheral device has a buffer memory configured to accumulate the read data received by the communication block from the device subject to communication in a manner in which the received read data is readable by the device subject to connection; and, when the read data has been accumulated in the buffer memory, the input/output block outputs a ready signal indicative that the read data is ready for reading to the device subject to connection.

Suitably, the peripheral device has a power supply terminal configured to receive power from the device subject to connection upon detection of connection of the peripheral device by the device subject to connection; and the communication block operates on the power supplied from the power supply terminal, thereby detecting the device subject to communication that is communicable with the communication block.

Suitably, the peripheral device has an incorporated memory configured to store data accessible by the device subject to connection; and a selector switch block, the selector switch block making the device subject to communication accessible by the device subject to connection if the device subject to communication that is communicable by the communication block is detected and the incorporated memory accessible by the device subject to connection if the device subject to communication that is communicable by the communication block is not detected.

Suitably, the communication block detects the device subject to communication that is communicable by the communication block; and the peripheral device has a detection terminal configured for the device subject to connection to detect connection of the peripheral device upon connection of the peripheral device to the device subject to connection and a terminal control block configured to control the detection terminal in a state where the device subject to connection detects connection of the peripheral device upon detection of the device subject to communication that is communicable by the communication block.

Suitably the peripheral device has a buttery configured to supply power to the communication block.

Suitably, the peripheral device has a wireless power receive block configured to wirelessly receive power from the external storage device; a detection terminal configured for the device subject to connection to detect connection of the peripheral device upon connection of the peripheral device to the device subject to connection; and a terminal control block configured to control the detection terminal in a state where the device subject to connection detects connection of the peripheral device upon reception of power by the wireless power receive block.

Suitably, the peripheral device has a power supply terminal configured to receive power supplied from the device subject to connection upon detection of connection of the peripheral device by the device subject to connection and the communication block operates on the power supplied from the power supply terminal.

Suitably, the peripheral device has a power supply terminal configured to receive power supplied from the device subject to connection upon detection of connection of the peripheral device by the device subject to connection and a wireless power supply block configured to operate on the power supplied from the power supply terminal, thereby supplying the power to the external storage device; and the communication block communicates with the external storage block to which the power is supplied from the wireless power supply block.

Suitably, the communication block wirelessly communicates with a device subject to communication with which data is transferred in a wireless manner and the peripheral device is a card-type communication device that is inserted in a card slot of the device subject to connection.

In carrying out the invention and according to another embodiment thereof, there is provided a device connection system. This device connection system has a device subject to connection; a peripheral device that is connected to the device subject to connection; and a device subject to communication that is separate from the device subject to connection. This peripheral device has an input/output block that is connected to the device subject to connection, a communication block configured to communicate with the device subject to communication, and a conversion block configured, if the device subject to communication is a storage device, to convert a storage access command output by the device subject to connection to the input/output block into a communication command that is transferred between the communication block and the device subject to communication, and the communication block transmitting the communication command generated by the conversion block to the device subject to communication, thereby transferring, with the device subject to communication, one of data that is written by the device subject to connection to the device subject to communication and data that is read from the device subject to communication.

In carrying out the invention and according to still another embodiment thereof, there is provided a device connection system. This device connection system has a device subject to connection; a peripheral device that is connected to the device subject to connection; and a device subject to communication that is separate from the device subject to connection. This peripheral device has an input/output block that is connected to the device subject to connection, a communication block configured to communicate with the device subject to communication, and a conversion block configured to convert a storage access command output by the device subject to connection into a communication command that is transferred between the communication block and the device subject to communication, and the communication block transmitting the communication command generated by the conversion block to the device subject to communication, thereby transferring, with the device subject to communication, one of data that is written by the device subject to connection to the device subject to communication and data that is read from the device subject to communication.

As described above and according to embodiments of the present invention, the data access from a device subject to connection (or a connection mate device), such as an electronic device, to a device subject to communication (or a communication mate device) can be universally facilitated.

BRIEF DESCRIPTION OF THE DRAWINGS

FIG. 11 is an exemplary format for data that are transferred by process T12 shown in FIG. 9;

FIG. 12 is a diagram illustrating an exemplary data that are processed inside a memory card by a data receive command and a data write command or a data receive command with header/footer and a data write command;

FIG. 21 is a timing chart indicative of a detection operation of a device connection system practiced as the fifth embodiment of the invention.

DETAILED DESCRIPTION OF THE PREFERRED EMBODIMENTS

This invention will be described in further detail by way of embodiments thereof with reference to the accompanying drawings. The description will be made in the following order:

(1) the first embodiment (an example in which a device subject to communication, or communication mate device, is accessed for read/write operations);
(2) the second embodiment (an example in which switching is made between an internal memory and a device subject to communication);
(3) the third embodiment (an example in which a memory card is detected by the detection of a device subject to communication);
(4) the fourth embodiment (an example in which a memory card is detected by receiving power from a device subject to communication); and
(5) the fifth embodiment (an example of a memory card that communicates with a device subject to communication by supplying power thereto).

(1) The First Embodiment

Configuration of a Device Connection System 1

Figure 1:
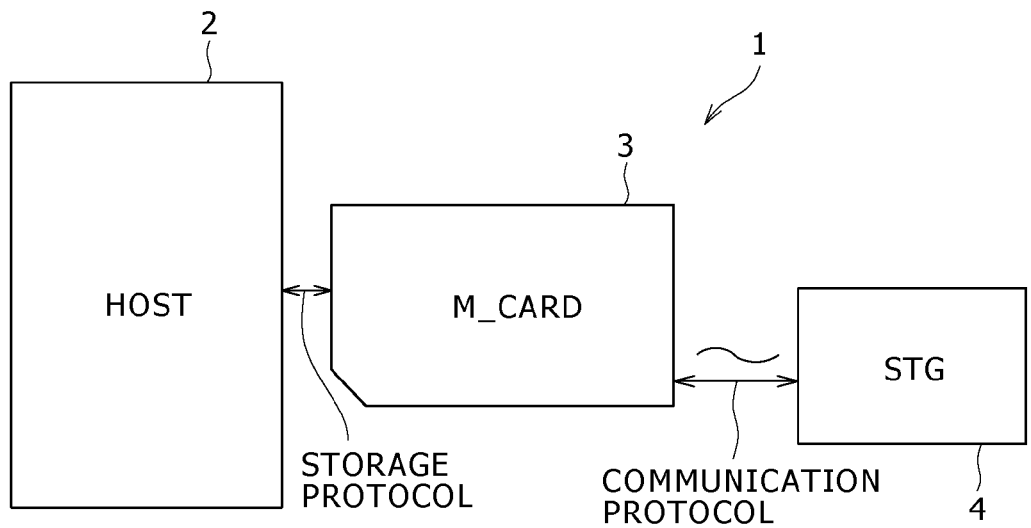
FIG. 1 is a system configuration diagram illustrating a device connection system practiced as first embodiment of the invention.

Now, referring to FIG. 1, there is shown a system configuration diagram illustrating the device connection system 1 practiced as the first embodiment of the invention. The device connection system 1 shown in FIG. 1 has a host device 2, a memory card 3, and an external storage unit 4.

The memory card 3 has a card-shaped housing 30. The memory card 3 is a storage unit with the housing 30 detachably inserted in the host device 2.

The memory card 3 thus configured includes a card-type semiconductor memory based on a nonvolatile memory, such as a flash memory for example.

The memory card 3 connected to the host device 2 stores data supplied from the host device 2 on the basis of a memory card IF storage protocol.

In addition, the memory card 3 outputs requested data to the host device 2 in accordance with the storage protocol.

Further, the memory card 3 executes wireless communication with the external storage unit 4 in accordance with a predetermined communication protocol.

The host device 2 is a device on which the memory card 3 is detachably loaded.

The host device 2 thus configured includes a personal computer unit, a digital camera, a portable game machine, a mobile phone, and other electronic devices.

The host device 2 communicates with the memory card 3 connected to the host device 2.

In accessing the memory card 3, the host device 2 uses storage access commands prepared for the memory card IF.

The storage access commands include write request command and a read request command, for example.

These commands may be binary codes or commands written in XML (Extensible Markup Language) for example.

In storing data in the memory card 3, the host device 2 executes data write processing in accordance with the memory card IF storage protocol.

In write processing, the host device 2 outputs a write request command and write data stored in the memory card 3 to the memory card 3.

Consequently, the memory card 3 stores the data entered along with the write request command from the host device 2 as a write data.

In reading data from the memory card 3, the host device 2 executes read processing in accordance with the memory card IF storage protocol.

In read processing, the host device 2 outputs a read request command to the memory card 3.

Consequently, the memory card 3 outputs the read data requested by the read request command to the host device 2.

The external storage unit 4 executes wireless communication with the memory card 3 by wireless communication based on a predetermined communication protocol.

The external storage unit 4 stores data received from the memory card 3 or the like.

The external storage unit 4 thus configured includes a hard disk drive, an optical disk drive, a data server, a liquid crystal monitor, and a personal computer, for example.

The external storage unit 4 may also be an electronic device, such as a personal computer, a digital camera, a portable game machine, or a mobile phone on which the memory card 3 is loaded.

The external storage unit 4 and the memory card 3 wirelessly communicate with each other according to a predetermined communication protocol.

Communication protocol commands for use between the memory card 3 and the external storage unit 4 include a transmit command and a receive command, for example.

These commands may be binary codes or commands written in MXL, for example.

Upon receiving a communication protocol command from the memory card 3, the external storage unit 4 executes the processing corresponding to the received command.

For example, upon receiving a transmit command and write data from the memory card 3 in accordance with a communication protocol procedure, the external storage unit 4 stores the received write data.

Upon receiving a receive command from the memory card 3, the external storage unit 4 reads data therefrom and transmits the read data to the memory card 3 in accordance with a procedure based on the communication protocol.

Figure 2:
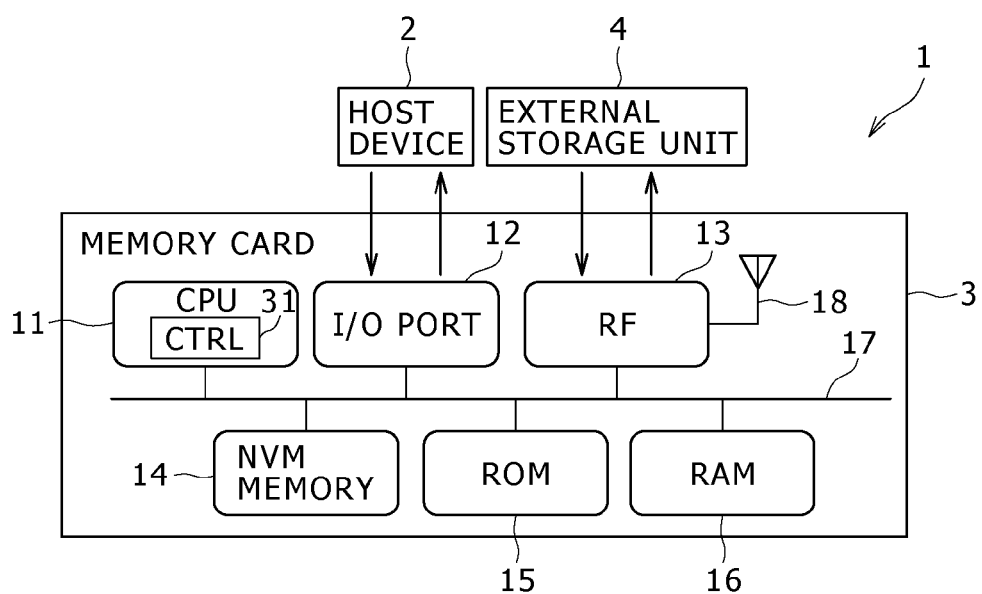
FIG. 2 is a block diagram illustrating an exemplary configuration of a memory card shown in FIG. 1.

Referring to FIG. 2, there is shown a block diagram illustrating an electrical configuration of the memory card 3 shown in FIG. 1.

Figure 3:
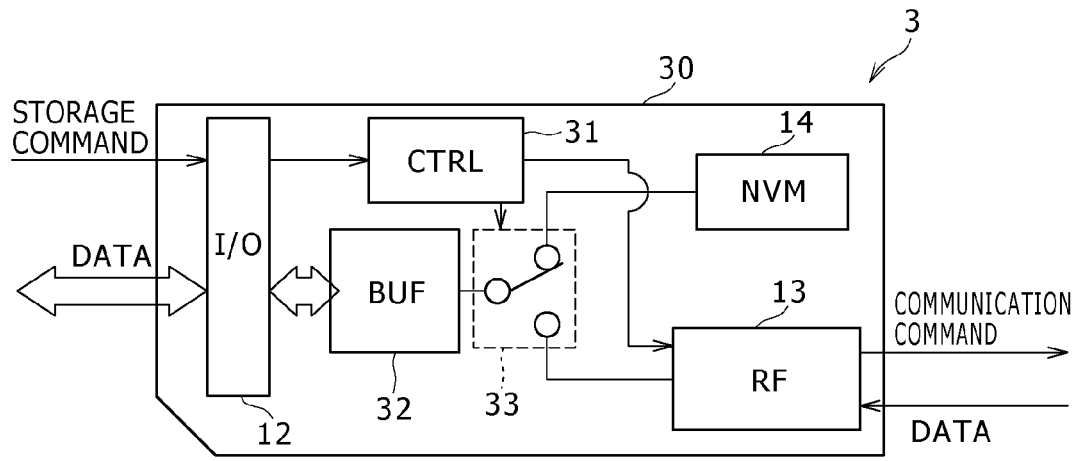
FIG. 3 is a schematic block diagram illustrating the memory card shown in FIG. 1.

Referring to FIG. 3, there is shown a schematic diagram illustrating flows of data in the memory card 3 shown in FIG. 1.

As shown in FIG. 2, the memory card 3 has a CPU (Central Processing Unit) 11, an input/output port (an I/O port) 12, and a wireless communication block (RF) 13.

In addition, the memory card 3 has a nonvolatile memory (NVM) 14, a ROM 15, a RAM 16, and a system bus 17 configured to interconnect these components. The CPU 11 provides a control block (CTRL) 31.

Further, the memory card 3 has a buffer memory (BUF) 32 and a selector switch 33.

Still further, the memory card 3 has a card-type housing 30 that is configured to be detachably inserted in a card slot of the host device 2 as shown in FIG. 3.

When the memory card 3 is loaded on the host device 2, the input/output port 12 functions as an input/output block to be connected to the host device 2.

Through the input/output port 12, the memory card 3 loaded on the host device 2 is wiredly connected to the host device 2.

Then, the a signal containing a storage access command specified for memory card IF or data is entered in the input/output port 12 from the host device 2.

The input/output port 12 outputs a signal containing requested read data requested by the host device 2 to the host device 2.

The wireless communication block 13 has an antenna 18 and transmits and receives communication data with the external storage unit 4 in accordance with a predetermined wireless communication protocol.

The antenna 18 may be incorporated in the housing of the memory card 3 or externally attached to the housing.

The communication protocol is TransferJet, USB (Ultra Wide Band), NFC (Near Field Communication), Bluetooth (trademark), or IEEE 802.11a/b/g/n, for example.

The nonvolatile memory (NVM) 14 is a memory capable of writing data, such as an EEPROM or a flash memory.

The nonvolatile memory (NVM) 14 stores data for use in the host device 2, for example.

The RAM 16 shown in FIG. 2 stores programs read by the CPU 11 and data for use in program execution.

The RAM 16 stores the data for use in program execution in a temporary manner.

The ROM 15 stores programs read by the CPU 11 for execution and data for use by the CPU 11 in program execution.

Each program to be executed by the CPU 11 of the memory card 3 is referred to as a firmware program.

A firmware program may be one that is stored in the ROM 15 before shipment from factory or one that is stored after shipment from factory.

The firmware program stored in the ROM 15 may be one that is installed from a computer-readable recording media, such as a CD-ROM for example.

Alternatively, the firmware program may be one that is downloaded for storage from a server via a transmission media, such as the Internet.

It should be noted that a part or all of a program may be stored in the nonvolatile memory (NVM) 14.

The buffer memory 32 is readable and writable by the host device 2 via the input/output port 12.

The buffer memory 32 provides the memory card 3 by use of a partial storage area of the nonvolatile memory (NVM) 14 or the RAM 16.

The buffer memory 32 is recommended to have a storage area greater than the data that can be transmitted for received by a single communication session by the wireless communication block 13, for example.

The selector switch 33 is connected to the buffer memory 32, the nonvolatile memory (NVM) 14, and the wireless communication block 13.

On the basis of a control signal received from the control block 31, the selector switch 33 selects one of the nonvolatile memory (NVM) 14 and the wireless communication block 13 to connect the selected component to the buffer memory 32.

The CPU 11 is started upon a power-on sequence of the memory card 3 to read a program from the ROM 15 for execution.

Consequently, the control block 31 is realized on the memory card 3.

Then, the control block 31 manages the operations of the input/output port 12, the wireless communication block 13, the nonvolatile memory (NVM) 14, the buffer memory 32, and the selector switch 33 in the memory card 3.

In addition, when a storage access command specified for memory card IF is entered from the host device 2, the control block 31 executes the processing corresponding to the entered command.

Further, when a write request command is entered as a storage access command, the control block 31 converts this command into a transmit command.

Still further, when a read request command is entered as a storage access command, the control block 31 converts this command into a receive command.

An Example of Communication Protocol, TransferJet

TransferJet is a communication protocol configured to realize one-to-one high-speed short-range data communication up to 560 Mbps that uses an electromagnetic wave of 4.48 GHz at −70 dBm/MHz.

An antenna 18 of TransferJet is called a coupler because this antenna transmits and receives electromagnetic waves with another antenna 18 by electromagnetic induction.

Figure 4:
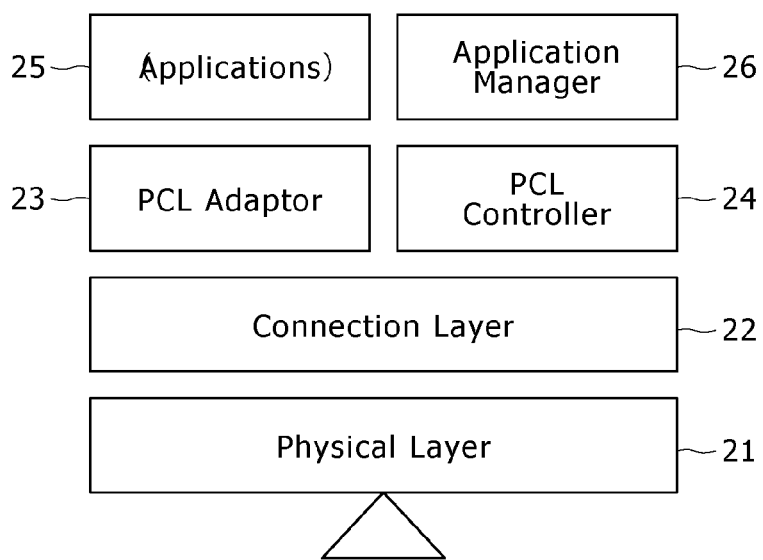
FIG. 4 is a schematic diagram describing the communication protocol stack of TransferJet.

Referring to FIG. 4, there is shown one example of a communication protocol stack for wireless communication based on TransferJet.

In TransferJet, connection layer 22 is stacked in a physical layer 21 that is the bottom layer.

In the connection layer 22, a protocol conversion adaptor layer 23 and a protocol conversion controller layer 24 are stacked.

Above the protocol conversion adaptor layer 23, an application layer 25 is stacked.

Above the protocol conversion controller layer 24, an application manager layer 26 is stacked.

The physical layer 21 is equivalent to the wireless communication block 13 for example.

The connection layer 22 is realized by the execution of a communication protocol program stored in the ROM 15 by the CPU 11, for example.

The protocol conversion adaptor layer 23 is realized by the execution of a protocol conversion adaptor program stored in the ROM 15 by the CPU 11, for example.

The protocol conversion controller layer 24 is realized by the execution of a protocol conversion controller program stored in the ROM 15 by the CPU 11, for example.

The application layer 25 is realized by the execution of various application programs stored in the ROM 15 by the CPU 11, for example.

The application manager layer 26 is realized by the execution of an operating system stored in the ROM 15 by the CPU 11, for example.

In the wireless communication based on TransferJet, application data is transferred between the application layers 25 of two devices, for example.

This application data is output from the application layer 25 to the physical layer 21 via the protocol conversion adaptor layer 23 and the connection layer 22, for example.

The protocol conversion adaptor layer 23 and the connection layer 22 add various additional data to the application data to generate communication data compliant with the communication protocol of TransferJet.

Figure 5:
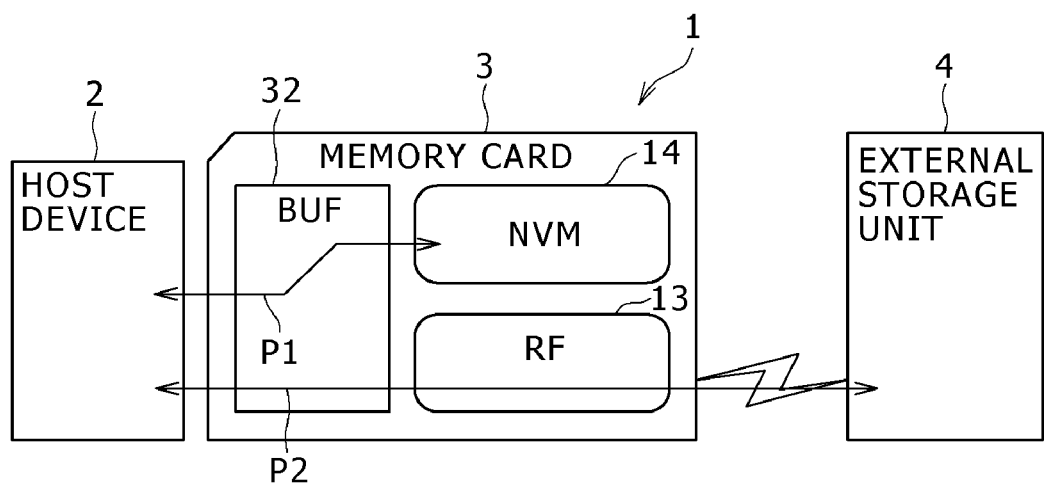
FIG. 5 is a schematic diagram describing data transfer paths in the device connection system shown in FIG. 1.

Referring to FIG. 5, there are shown transfer data paths in the device connection system 1 shown in FIG. 1.

In the memory card 3 shown in FIG. 5, the buffer memory 32, the nonvolatile memory (NVM) 14, and the wireless communication block 13 are shown.

In the device connection system 1 shown in FIG. 5, there are a first data path P1, a second data path P2, and a third data path P3 as the data path for transferring data.

The first data path P1 transfers data between the host device 2 and the nonvolatile memory (NVM) 14. The data on the first data path P1 goes through the buffer memory 32.

The host device 2 writes data to the nonvolatile memory (NVM) 14 via the first data path P1 and reads data from the nonvolatile memory (NVM) 14 via the first data path P1.

The second data path P2 transfers data between the host device 2 and the external storage unit 4. The data on the second data path P2 goes through the buffer memory 32 and the wireless communication block 13.

The host device 2 writes data to the external storage unit 4 via the second data path P2 and reads data from the external storage unit 4 via the second data path P2.

Figure 6:
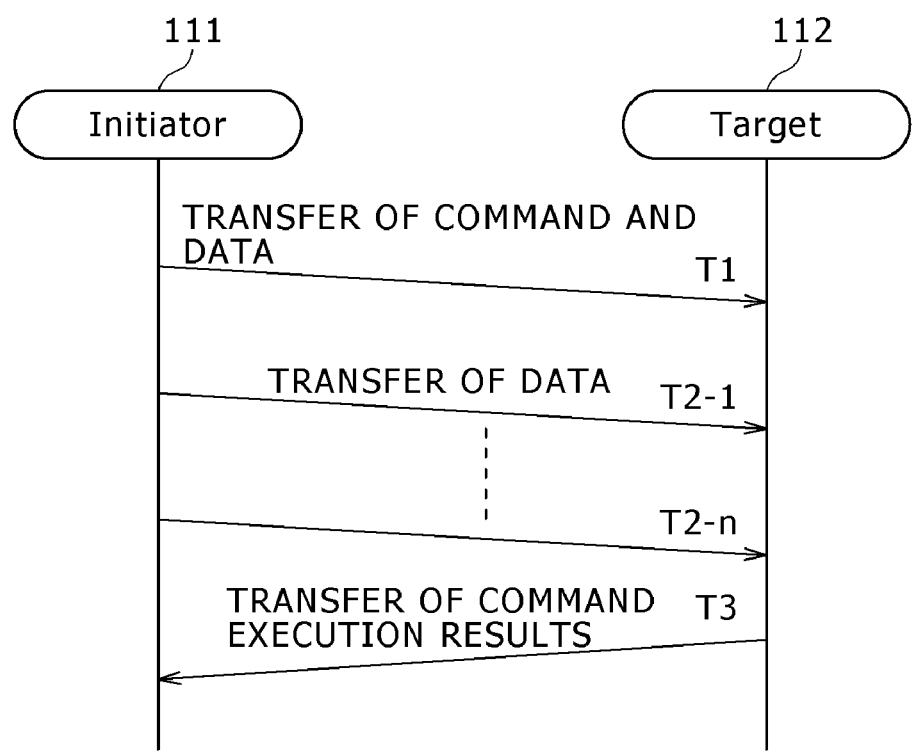
FIG. 6 is an exemplary communication procedure based on TransferJet.

Referring to FIG. 6, there is shown one example of the communication procedure based on TransferJet.

FIG. 6 shows an example in which data is transferred from the memory card 3 to the external storage unit 4. FIG. 6 also shows an example in which the memory card 3 functions as an initiator 111 and the external storage unit 4 functions as a target 112.

In transferring data from the initiator 111 to the target 112, the initiator 111 transfers a command and data (T1).

Receiving the command and the data, the target 112 executes the received command and processes the received data accordingly.

When the initiator 111 transfers two or more pieces of data, the target 112 processes the received two or more data (T2-1 through T2-n).

Upon completion of the command processing, the target 112 transmits a command execution result (ACK) to the initiator 111 (T3).

The command execution result includes information indicative of the normal completion of the data processing, information indicative of the occurrence of an error encountered during the data processing, thereby failing the processing, and other kinds of information.

Figure 7:
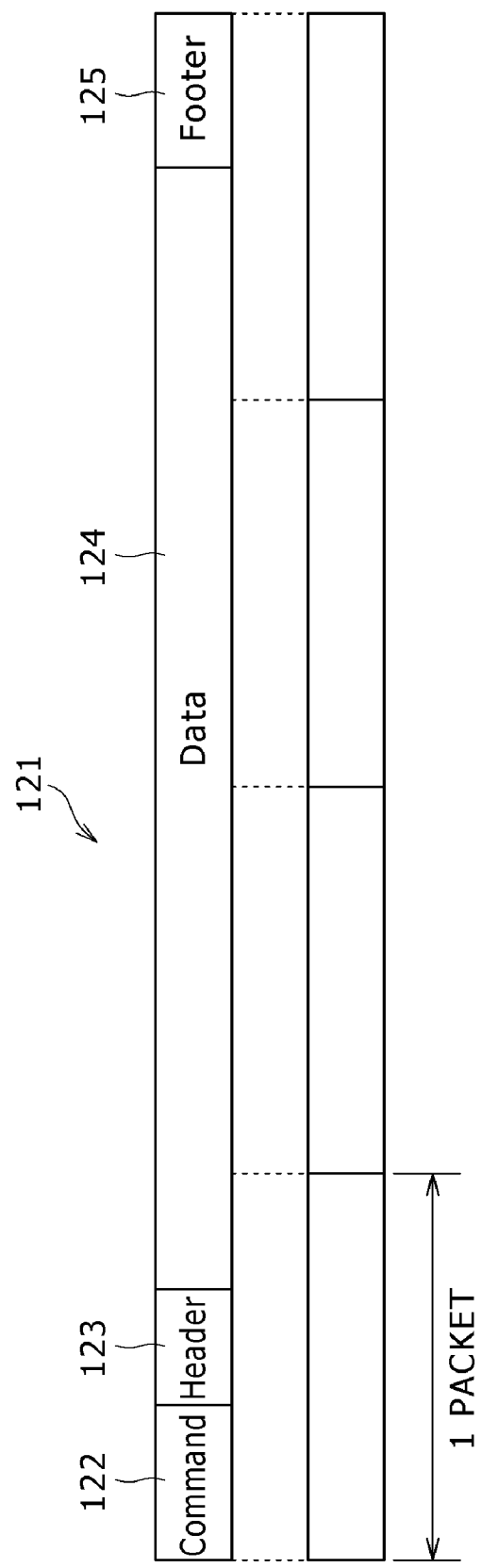
FIG. 7 is a diagram illustrating an exemplary format for commands and data that are transferred by process T1 shown in FIG. 6.

Referring to FIG. 7, there is shown a diagram describing one example of formats of a transmit command and data that are transferred in processing T1 shown in FIG. 6.

A format data 121 shown in FIG. 7 includes command data 122, header data 123, actual data 124, and footer data 125. This command and the format data 121 for data are specified by a wireless communication standard, such as TransferJet, for example.

The command data 122 is indicative of a command that is executed by the target 112. In the case of a transmit command, the target 112 executes data reception processing and data storage processing.

The actual data 124 is indicative of data that is processed by the target 112. The actual data 124 contains data to be written by the host device 2 to the external storage unit 4 and other data.

The header data 123 and the footer data 125 are indicative of information, such as data length and information about a command that specifies data transfer. The header data 123 and the footer data 125 are specified by the wireless communication standard.

The format data 121 shown in FIG. 7 is transferred in packets specified by the wireless communication standard, for example. In FIG. 7, the format data 121 is divided into four packets.

Figure 8:
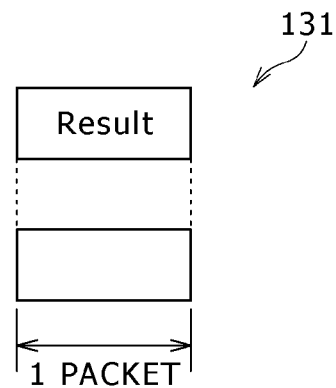
FIG. 8 is a diagram illustrating an exemplary format for command execution results that are transferred by process T3 shown in FIG. 6.

Referring to FIG. 8, there is shown one example of a format for command execution result (ACK) that is transferred in processing T3 shown in FIG. 6.

Command execution data 131 shown in FIG. 8 includes data indicative of a result of the command execution done by the target 112. A data format of the command execution result data is specified by a wireless communication standard, such as TransferJet.

The command execution result data shown in FIG. 8 is transferred in one packet specified by the wireless communication standard, for example.

Figure 9:
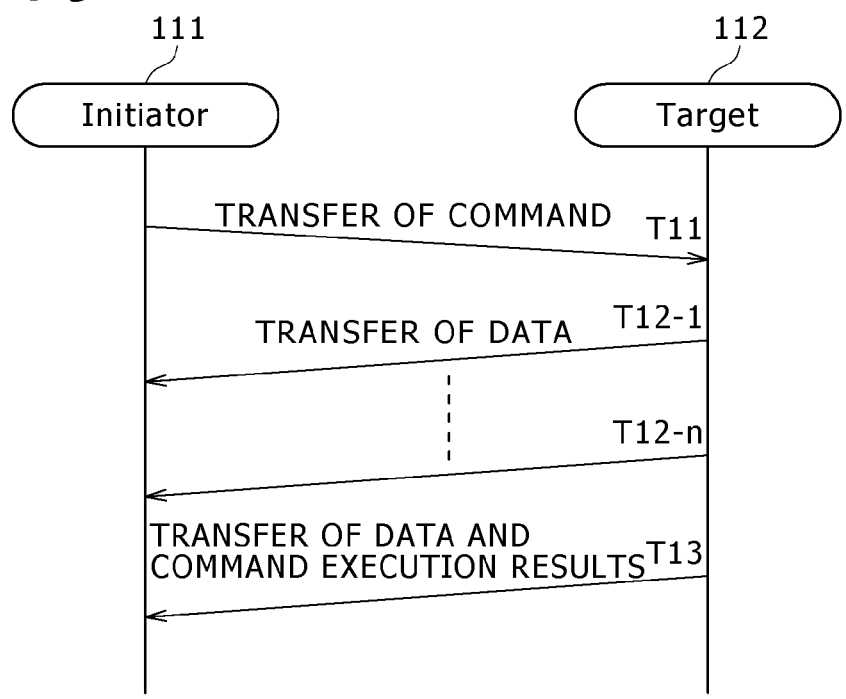
FIG. 9 is another exemplary communication procedure based on TransferJet.

Referring to FIG. 9, there is shown one example of another communication procedure based on TransferJet.

FIG. 9 shows an example in which data is transferred from the external storage unit 4 to the memory card 3. FIG. 9 also shows an example in which the memory card 3 functions as the initiator 111 and the external storage unit 4 functions as the target 112.

In transferring data from the target 112 to the initiator 111, the initiator 111 transmits a command (T11).

Receiving the command, the target 112 executes the received command. The target 112 transmits the data requested by the command (T12-1 through T12-n).

Upon completion of transfer of two or more pieces of data, the target 112 transmits a command execution result (ACK) to the initiator 111 (T13).

The command execution results includes information indicative of the normal completion of the data processing, information indicative of the occurrence of an error encountered during the data processing, thereby failing the processing, and other kinds of information.

Figure 10:
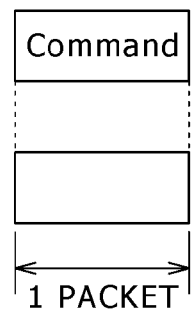
FIG. 10 is a diagram illustrating an exemplary format for commands that are transferred by process 11 shown in FIG. 9.

Referring to FIG. 10, there is shown a diagram describing one example of a command format that is transferred in processing T11 shown in FIG. 9.

Command data 141 shown in FIG. 10 includes data indicative of a command that is executed by the target 112.

The command data 141 is specified by a wireless communication standard, such as TransferJet. In the case of a receive command, the target 112 executes the processing of reading requested data and the transmission processing for transmitting the processed data.

The command format shown in FIG. 10 is transferred in one packet specified by the wireless communication standard, for example.

Referring to FIG. 11, there is shown one example of a format for data that is transferred in processing T12 shown in FIG. 9.

Format data 151 shown in FIG. 11 includes header data 152, padding data 153, actual data 154, and footer data 155. The actual data 154 includes the footer data 155. The format data 151 is specified a wireless communication standard, such as TransferJet.

The actual data 154 is processed by the initiator 111. The actual data 154 has read data that is read by the host device 2 from the external storage unit 4.

The padding data 153 is added to made the data length of communication data a predetermined data length suitable for communication.

The header data 152 and the footer data 155 provide information indicative of a data length and a command specifying data transfer. The header data 152 and the footer data 155 are specified by the wireless communication standard.

For example, the header data 152 and the footer data 155 store, in the data to be used, the connection layer 22, the protocol conversion adaptor layer 23, and the protocol conversion controller layer 24 of TransferJet.

Also, the header data 152 and the footer data 155 may include the data type and data format of the format data 151.

The data format shown in FIG. 11 is divided into packets specified by the wireless communication standard, for example, and the resultant packets are transferred. In FIG. 11, the format data is divided into 7 packets.

In the data communication based on TransferJet, the protocol conversion adaptor layer 23 and the connection layer 22 add header data, footer data and padding data to the real data, thereby generating the format data 151 shown in FIG. 11.

The physical layer 21 transmits this format data 151.

Referring to FIG. 12, there is shown a relationship of data that are processed in the memory card 3 by a data receive command and a write command or a data receive command with header/footer and a write command in TransferJet.

Transfer data 1 (1600) shown in FIG. 12 is processed in the memory card 3 upon execution of data reception and a write command by the host device 2.

Transfer data 2 (1601) shown in FIG. 12 is processed in the memory card 3 upon execution of the reception of data with header/footer and a write command by the host device 2.

Figure 13:
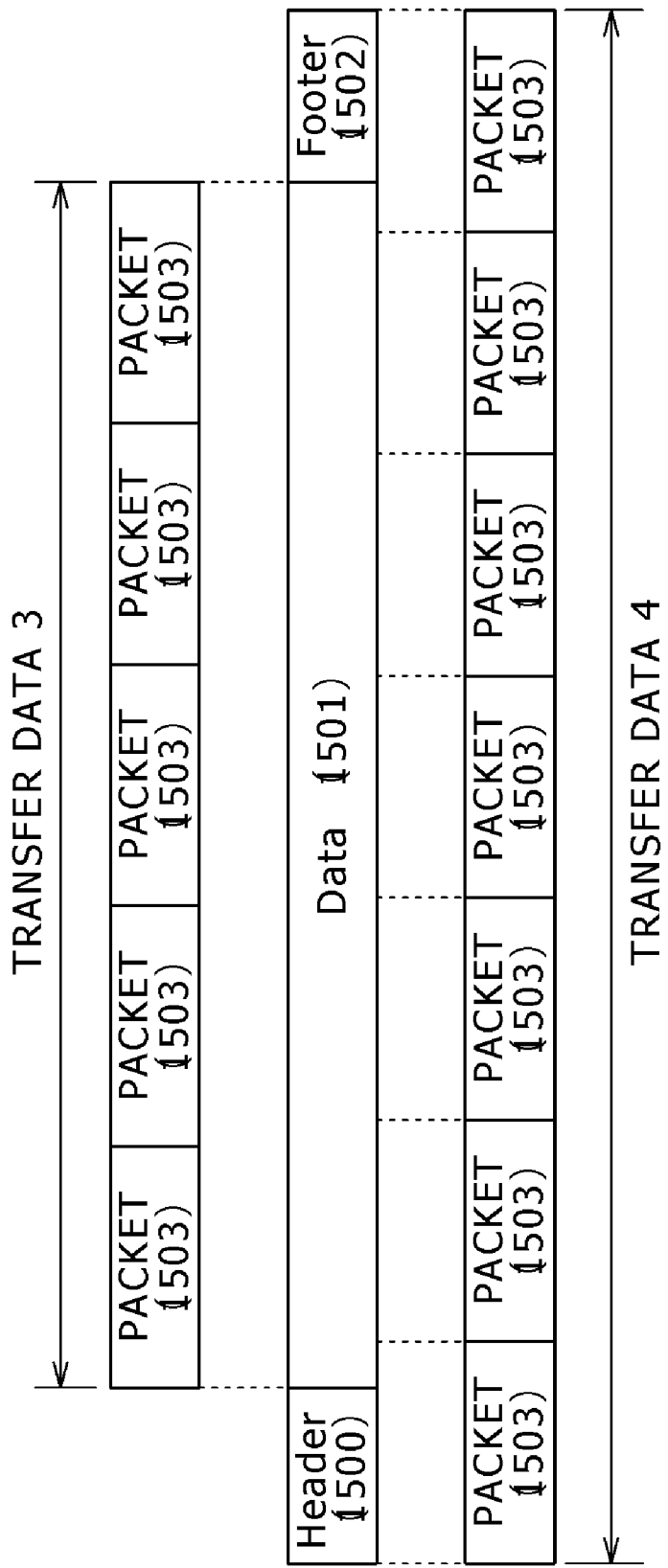
FIG. 13 is a diagram illustrating an exemplary data that are processed inside a memory card by a data read command and a data transmit command or a data read command and a data transmit command with header/footer.

Referring to FIG. 13 there is shown a relationship of data that are processed in the memory card 3 by a read command and a data transmit command or a read command and a data transmit command with header/footer in TransferJet.

Transfer data 3 (1700) shown in FIG. 13 is processed in the memory card 3 upon execution of a read command and a data transmit command by the host device 2.

Transfer data 4 (1701) show in FIG. 13 is processed in the memory card 3 upon execution of a read command and a data transmit command with header/footer.

Operations of the Connection System 1

The following described operations to be executed by the device connection system 1.

In what follows, an example in which the host device 2 accesses the external storage unit 4 is mainly described.

In this example, the control block 31 makes the selector switch 33 select the wireless communication block 13.

This makes the wireless communication block 13 ready for reading data from the buffer memory 32 to be ready for the transmission of the data.

In addition, the wireless communication block 13 is able to store the received data in the buffer memory 32.

Figure 14:
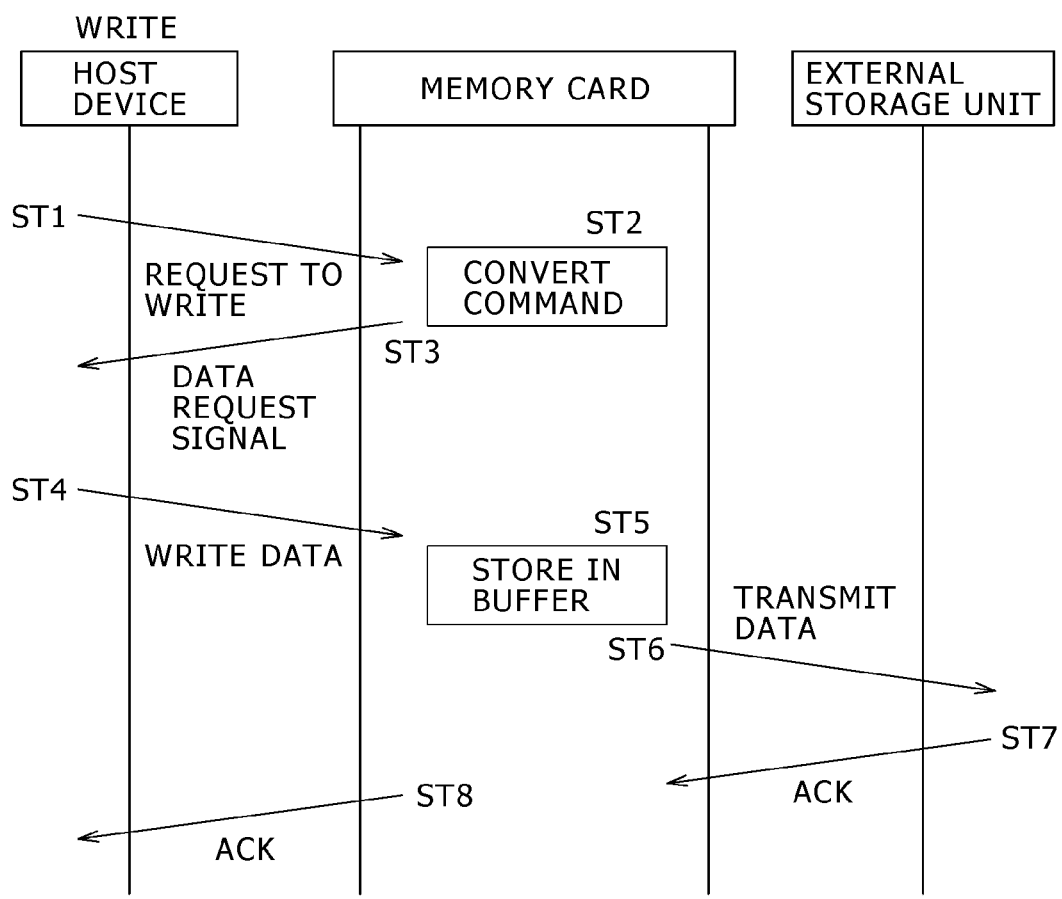
FIG. 14 is a timing chart indicative of timings at the time when a host device performs write access to an external storage unit.

Referring to FIG. 14, there is shown a flowchart indicative of the timings at the time when the host device 2 performs write access to the external storage unit 4.

In write-accessing the external storage unit 4, the host device 2 executes substantially the same processing as in write accessing the memory card 3.

To be more specific, the host device 2 outputs a write request command to the memory card 3 (step ST1). The write command is entered in the control block 31 through the input/output port 12 of the memory card 3.

When the write command is entered, the control block 31 converts the write command into a transmit command (step ST2).

At the same time, the control block 31 outputs a data request signal specified in the storage access protocol to the host device 2 (step ST3).

This data request signal is the same signal as a data request signal output by the control block 31 when the nonvolatile memory (NVM) 14 of the memory card 3 is write-accessed.

The data request signal is output from the input/output port 12 to the host device 2.

When the data request signal is entered, the host device 2 outputs the write data to be written to the external storage unit 4 to the input/output port 12 of the memory card 3 (step ST4).

This write data is temporarily stored in the buffer memory 32 (step ST5).

Then, when data is accumulated in the buffer memory 32 in an amount more than the minimum data amount that is wirelessly communicable, the control block 31 starts data transmission processing (step ST6).

To be more specific, the control block 31 outputs a transmit command to the wireless communication block 13.

Also, the control block 31 instructs the wireless communication block 13 to transmit the data held in the buffer memory 32.

The wireless communication block 13 reads the write data held in the buffer memory 32 and transmits the read data along with a transmit command. In this case, the wireless communication block 13 stores the transmit command and the write data in the format shown in FIG. 7 and wirelessly transmit these command and data.

The wirelessly transmitted communication data is received by the external storage unit 4.

Receiving the communication data shown in FIG. 7, the external storage unit 4 interprets the data format of the received data to extracts the transmit command and the write data from the received data.

Receiving the transmit command from the memory card 3, the external storage unit 4 executes the processing of receiving and storing the received data.

Consequently, the write data to be written by the host device 2 to the external storage unit 4 is stored in the external storage unit 4.

Upon completion of the processing of the received transmit command, the external storage unit 4 wirelessly transmits the ACK data shown in FIG. 8 including a command execution result shown in FIG. 8 to the memory card 3 (step ST7).

This ACK data is received by the wireless communication block 13 of the memory card 3 to be output to the control block 31.

Receiving the ACK data from the external storage unit 4, the control block 31 outputs an ACK signal to the host device 2 (step ST8).

This ACK signal is the same as an ACK signal to be output from the control block 31 when the nonvolatile memory (NVM) 14 of the memory card 3 is write-accessed.

The ACK signal is output from the input/output port 12 to the host device 2.

Receiving this ACK signal, the host device 2 ends the write-access to the external storage unit 4.

Figure 15:
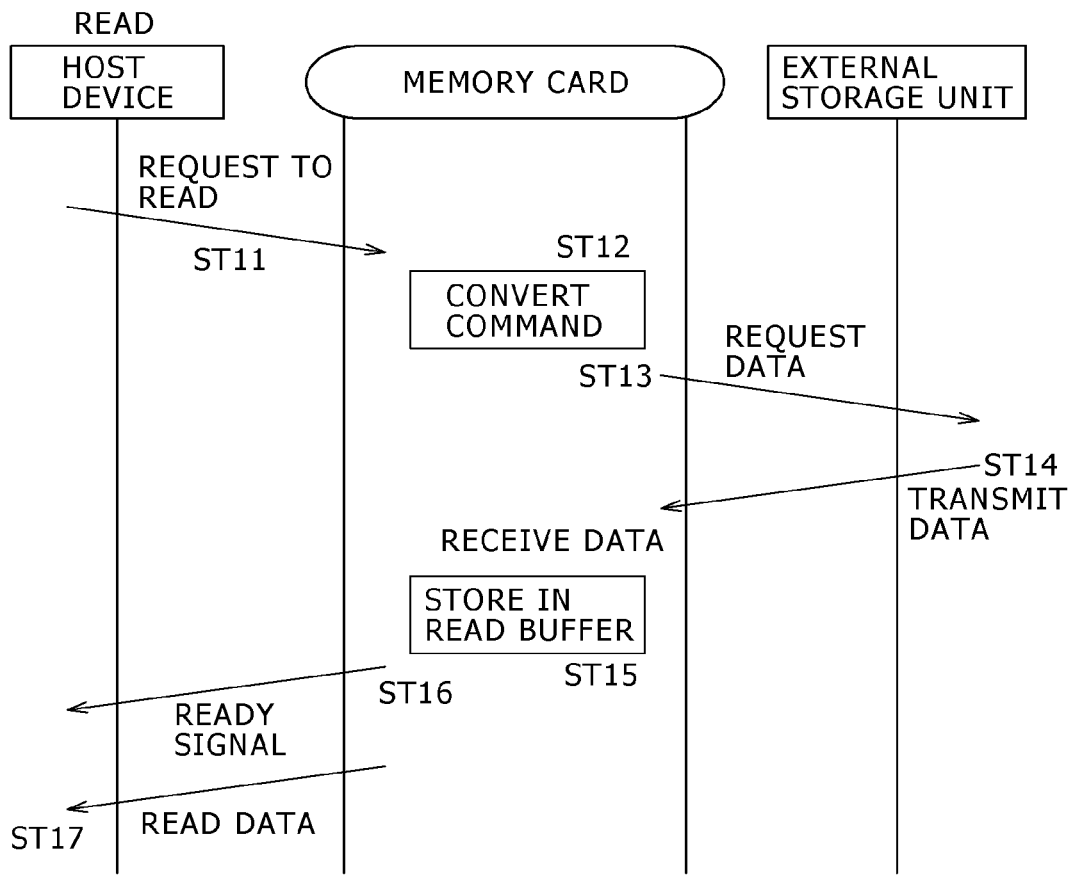
FIG. 15 is a timing chart indicative of timings at the time when a host device performs read access to an external storage unit.

Referring to FIG. 15, there is shown a timing chart at the time when the host device 2 performs read access to the external storage unit 4.

In read-accesses the external storage unit 4, the host device 2 executes the same processing in which the memory card 3 is read-accessed.

To be more specific, the host device 2 outputs a read request command to the memory card 3 (step ST11).

The request command is entered in the control block 31 through the input/output port 12 of the memory card 3.

Receiving the read request command, the control block 31 converts the received read quest command into a receive command. (step ST12).

The control block 31 outputs the receive command to the wireless communication block 13 (step ST13).

The wireless communication block 13 transmits the receive command shown in FIG. 10 to the external storage unit 4.

Receiving the receive command from the memory card 3, the external storage unit 4 executes the reading processing and transmission processing of the data requested for reception (step ST14).

The external storage unit 4 transmits the data of the data transfer format shown in FIG. 11 including the requested read data to the memory card 3.

The communication data shown in FIG. 11 including the read data is received by the wireless communication block 13. The wireless communication block 13 temporarily stores the received read data into the buffer memory 32 (step ST15).

Having output the receive command to the wireless communication block 13, the control block 31 monitors the buffer memory 32.

Then, when data is accumulated in the buffer memory 32 more than the minimum data amount readable by the host device 2, the control block 31 outputs a ready signal (step ST16).

This ready signal is the same ready signal as one that is output by the control block 31 when the nonvolatile memory (NVM) 14 of the memory card 3 is read-accessed.

The ready signal is then output from the input/output port 12 to the host device 2.

Receiving the ready signal the host device 2 executes the processing of reading the read data from the memory card 3 (step ST17).

To be more specific, the host device 2 accesses the buffer memory 32 of the memory card 3 to read data from the buffer memory 32.

Upon completion of the reading, the host device 2 ends the read access to the external storage unit 4.

As described above, in the first embodiment of the invention, the same processing as that in which the host device 2 executes read/write access to a normal memory card for the memory card 3 having a wireless communication function inserted in the host device 2 is executed.

Then, by executing a normal read access of the host device 2, the host device 2 executes read/write access to the external storage unit 4 that is wirelessly communicating with the memory card 3.

Therefore, in the first embodiment, if the connection mate of the memory card 3 having a wireless communication function is a storage device, the host can access this storage device as one that is directly connected to the host.

From the host device 2, it can be made appear that the access to the storage device be equal to the access to the memory card 3.

In addition, if the host device 2 can only recognize the memory card 3, the host device 2 can access the storage device by the same protocol as that of the current memory card 3. Or the host device 2 can recognize the memory card 3 to access the storage device.

Hence, in the first embodiment, there is no need for installing or mounting a new communication protocol established after the marketing of the host device 2 onto the host device 2.

Further, in the first embodiment, the host device 2 that can handling only the memory card 3 can use the external storage unit 4.

(2) The Second Embodiment

Configuration of a Device Connection System 1

Figure 16:
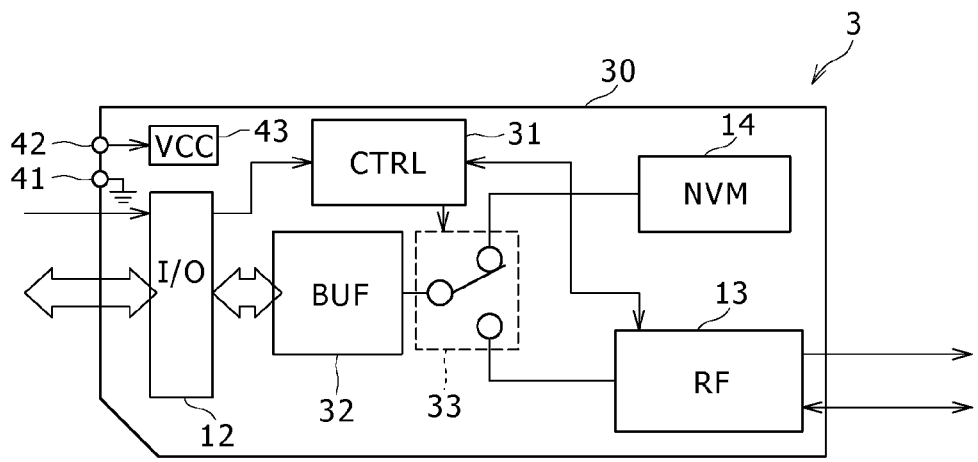
FIG. 16 is a schematic block diagram illustrating a memory card practiced as a second embodiment of the invention.

Referring to FIG. 16, there is shown a schematic block diagram illustrating a memory card 3 practiced as a second embodiment of the invention.

The memory card 3 shown in FIG. 16 has a detection terminal 41, a power supply terminal 42, and a power supply circuit 43.

The memory card 3 shown in FIG. 16 searches the external storage unit 4 after the detection of the memory card 3 by the host device 2. Depending on a search result, the host device 2 can access either the nonvolatile memory (NVM) 14 or the external storage unit 4.

The configurations of the memory card 3 and the device connection system 1 are substantially the same those of the embodiment 1 except for those described above. Therefore, similar components are denoted by the same reference numerals and the description thereof will be skipped.

The detection terminal 41 is connected to the ground of the memory card 3.

Then, when the memory card 3 has been loaded on the host device 2, the detection terminal 41 is connected to the host device 2.

If the detection potential of the detection terminal 41 is ground potential, the host device 2 determines that the memory card 3 has been connected to the host device 2.

Further, the host device 2 accesses the memory card 3 or the external storage unit 4.

The power supply terminal 42 is connected to the power supply circuit 43.

Then, if the memory card 3 has been inserted in the host device 2, the power supply terminal 42 is connected to the host device 2.

The host device 2 supplies a predetermined voltage to the power supply terminal 42. This supplies power to the power supply circuit 43.

The power supply circuit 43 converts the power supplied from the host device 2 and supplies the converted power to each component of the memory card 3.

The power supply circuit 43 supplies power to the CPU 11, the input/output port 12, the wireless communication block 13, the nonvolatile memory (NVM) 14, the ROM 15, and RAM 16 shown in FIG. 2, for example.

These components operate on the power supplied from the power supply circuit 43.

Operations of the Device Connection System 1

When the memory card 3 shown in FIG. 16 has been inserted in the host device 2, the input/output port 12, the detection terminal 41, and the power supply terminal 42 are connected to the host device 2.

The host device 2 supplies power from the power supply terminal 42 to the power supply circuit 43.

The power supplied from the power supply circuit 43 starts the operations of the CPU 11, wireless communication block 13, and so on of the memory card. The CPU 11 functions as the control block 31.

Starting the operation, the wireless communication block 13 starts the processing of detecting a mate device within the communication range.

Then, if there is found the external storage unit 4 for example in the communication range, the wireless communication block 13 detects the external storage unit 4.

The wireless communication block 13 outputs a detection signal to the control block 31.

Receiving the detection signal indicative of the detection of the external storage unit 4, the control block 31 instructs the selector switch 33 to output, from the nonvolatile memory (NVM) 14 and the wireless communication block 13, a signal for selecting the wireless communication block 13.

The buffer memory 32 is connected with the wireless communication block 13.

Consequently, by accessing the memory card 3, the host device 2 inserted with the memory card 3 shown in FIG. 16 can access the external storage unit 4 that wirelessly communicate the memory card 3.

On the other hand, of there is found no mate device, such as the external storage unit 4, in the communication range, then the wireless communication block 13 outputs a non-detection signal to the control block 31 after passing of a predetermined detection period.

Receiving the non-detection signal, the control block 31 instructs the selector switch 33 to output a signal for selecting the nonvolatile memory (NVM) 14 from the nonvolatile memory (NVM) 14 and the wireless communication block 13. The buffer memory 32 is connected with the nonvolatile memory (NVM) 14.

Consequently, if there is no mate device, such as the external storage unit 4 for example, in the communication range, the host device 2 inserted with the memory card 3 shown in FIG. 16 can access the nonvolatile memory (NVM) 14 of the memory card 3.

As described above, in the second embodiment of the invention, the memory card 3 has the load/unload detection function as with the normal memory card and the host device 2 supplies power after the detection of the insertion of the memory card 3.

In addition, in the second embodiment, the card having wireless communication function also has the memory card function, thereby detecting the presence or absence of a storage device having wireless communication function upon a power-on sequence.

If no storage device is found, the memory card 3 operates as the normal memory card.

If a storage device is found, the memory card 3 is switched to use the storage device having wireless communication function.

(3) The Third Embodiment

Configuration of a Device Connection System 1

Figure 17:
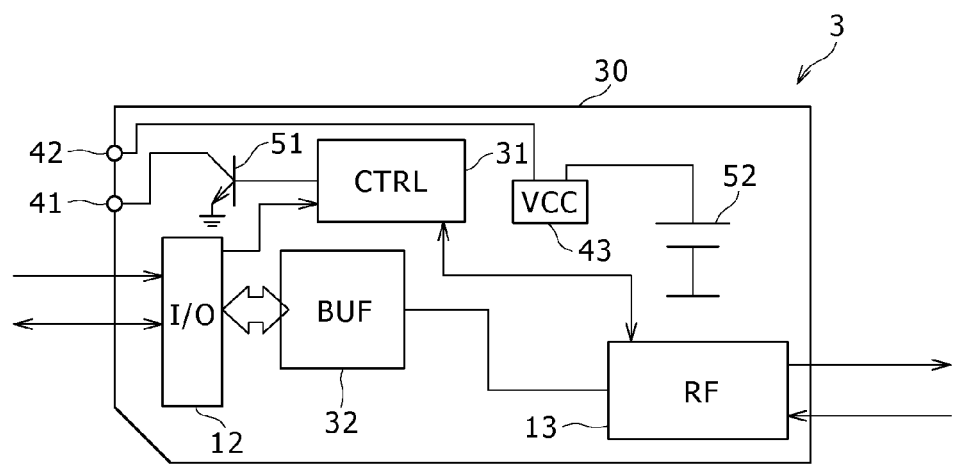
FIG. 17 is a schematic diagram illustrating a memory card practiced as a third embodiment of the invention.

Referring to FIG. 17, there is shown a schematic block diagram illustrating a memory card 3 practiced as a third embodiment of the invention.

The memory card 3 shown in FIG. 17 has a transistor 51 and a battery 52.

In addition, unlike the second embodiment described above, the memory card 3 shown in FIG. 17 has neither the nonvolatile memory (NVM) 14 nor the selector switch 33. A wireless communication block 13 is connected to a buffer memory 32.

With the memory card 3 shown in FIG. 17, the power supplied from the battery 52 or a host device 2 drive the wireless communication block 13 to search for an external storage unit 4 always or intermittently.

A control block 31 controls the transistor 51 in accordance with a result of the search made by the wireless communication block 13, thereby making the host device 2 detect the memory card 3.

The configurations of the memory card 3 and the device connection system 1 are substantially the same as those of the second embodiment except for the configurational parts mentioned above and therefore the similar components are denoted by the same reference numerals and the description thereof will be skipped.

The transistor 51 is an NPN bipolar transistor, for example. For the transistor 51, a PNP bipolar transistor or a CMOS transistor may be used.

The base electrode of the transistor 51 is connected to the control block 31 (CPU 11). The collector electrode of the transistor 51 is connected to the detection terminal 41. The emitter electrode of the transistor 51 is connected to the ground of the memory card 3.

Therefore, when the transistor 51 is in an on state, the detection terminal 41 is connected to ground.

When the transistor 51 is in an off state, the detection terminal 41 is disconnected from ground. The potential of the detection terminal 41 becomes indefinite.

The battery 52 is connected to the power supply circuit 43.

Hence, the power supply circuit 43 is connected with the battery 52 and the power supply terminal 42.

The power supply circuit 43 converts the power supplied from the battery 52 or the power supply terminal 42 and supplies the converted power to each component of the memory card 3.

Consequently, the wireless communication block 13 and so on of the memory card 3 can operate if the memory card 3 is not powered by the host device 2, thereby detecting the external storage unit 4 in the communication range.

Operations of the Device Connection System 1

For example, if the memory card 3 shown in FIG. 17 is inserted in the host device 2 when the external storage unit 4 is not detected by the wireless communication block 13 driven by the battery 52, the input/output port 12, the detection terminal 41, and the power supply terminal 42 are connected to the host device 2.

The host device 2 supplies power from the power supply terminal 42 to the power supply circuit 43 of the memory card 3.

The power supplied from the power supply circuit 43 starts the operations of the CPU 11, the wireless communication block 13, and so on of the memory card 3. The CPU 11 functions as the control block 31.

It should be noted that if the external storage unit 4 has not been detected by the wireless communication block 13, the control block 31 turns off the transistor 51.

Therefore, the potential of the detection terminal 41 becomes indefinite, so that the host device 2 does not detect the memory card 3 inserted in the host device 2.

Next, when the wireless communication block 13 detects the external storage unit 4, the control block 31 turns on the transistor 51 on the basis of the input of a detection signal supplied from the wireless communication block 13.

Consequently, the potential of the detection terminal 41 becomes ground potential.

The host device 2 detects the memory card 3 inserted in the host device 2.

Then, by accessing the memory card 3, the host device 2 inserted with the memory card 3 shown in FIG. 17 can access the external storage unit 4 that wirelessly communicates with the memory card 3.

As described above, in the third embodiment, the memory card 3 has the battery 52 to autonomously operate the wireless communication function.

Then, the memory card 3 makes the wireless communication function operate always or intermittently to confirm that the storage device having the wireless communication function is in the communicable range, thereby activating a load/unload detection mechanism of the memory card 3 having wireless communication function.

Consequently, in the third embodiment, if a storage device having wireless communication function has been detected by the memory card 3, it can be made as if the memory card 3 were inserted in the host device 2.

(4) The Fourth Embodiment

Configuration of a Device Connection System 1

Figure 18:
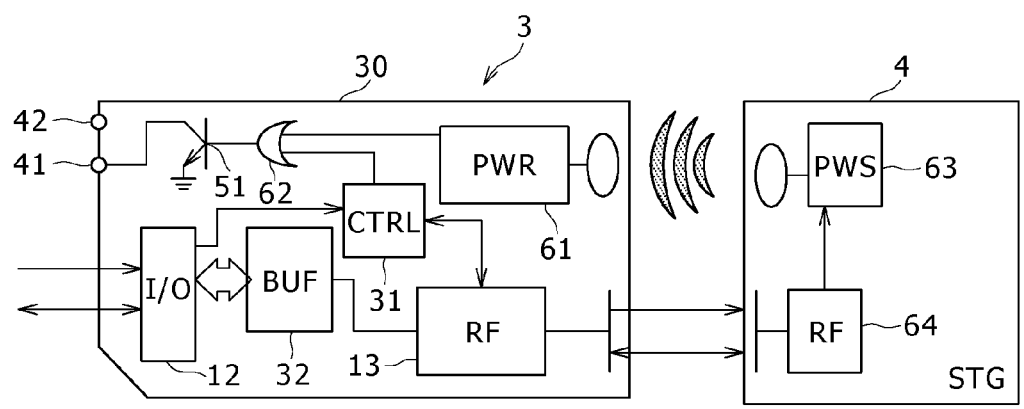
FIG. 18 is a schematic diagram illustrating a memory card and an external storage unit practiced as a fourth embodiment of the invention.

Referring to FIG. 18, there is shown a schematic diagram illustrating a memory card 3 and an external storage unit 4 practiced as the fourth embodiment of the invention.

The memory card 3 shown in FIG. 18 has a wireless power reception block 61 and an OR circuit 62.

The memory card 3 shown in FIG. 18 has no battery 52 shown in FIG. 17.

In the memory card 3 shown in FIG. 18, the power supplied from the wireless power reception block 61 or the power supplied from a host device 2 make the wireless communication block 13 search for an external storage unit 4 always or intermittently.

A control block 31 controls a transistor 51 in accordance with a result of the search by the wireless communication block 13, thereby maintaining the detection state of the memory card 3 by the host device 2.

The external storage unit 4 shown in FIG. 18 has a wireless power supply block 63. A wireless communication block 64 of the external storage unit 4 is also shown in FIG. 18. The wireless communication block 64 wirelessly communicates with the wireless communication block 13 of the memory card 3.

The configurations of the memory card 3 and the device connection system 1 are substantially the same as those of the third embodiment except for the configurational parts mentioned above and therefore the similar components are denoted by the same reference numerals and the description thereof will be skipped.

The wireless power supply block 63 of the external storage unit 4 transmits power electromagnetic wave.

The wireless power reception block 61 of the memory card 3 receives the power electromagnetic waves transmitted from the wireless power supply block 63. The wireless power reception block 61 is wirelessly powered by the external storage unit 4. The wireless power reception block 61 outputs the power generated from the received power electromagnetic waves to a power supply circuit 43.

The power supply circuit 43 converts the power supplied from the wireless power reception block 61 or the power supplied from the host device 2 and supplies the converted power to each component of the memory card 3. For example, the power supply circuit 43 supplies power to the OR circuit 62, the transistor 51, and so on.

Consequently, the wireless communication block 13 for example of the memory card 3 operate if the memory card 3 is not powered by the host device 2, thereby detecting the external storage unit 4 within the communication range.

Further, being powered, the wireless power reception block 61 outputs a high-level detection signal to the OR circuit 62.

The OR circuit 62 is connected to the transistor 51, the control block 31, and the wireless power reception block 61.

Receiving a high-level signal for turning on the transistor 51 from the control block 31 or the wireless power reception block 61, the OR circuit 62 outputs the received high-level signal to the transistor 51.

Operations of the Device Connection System 1

Figure 19:
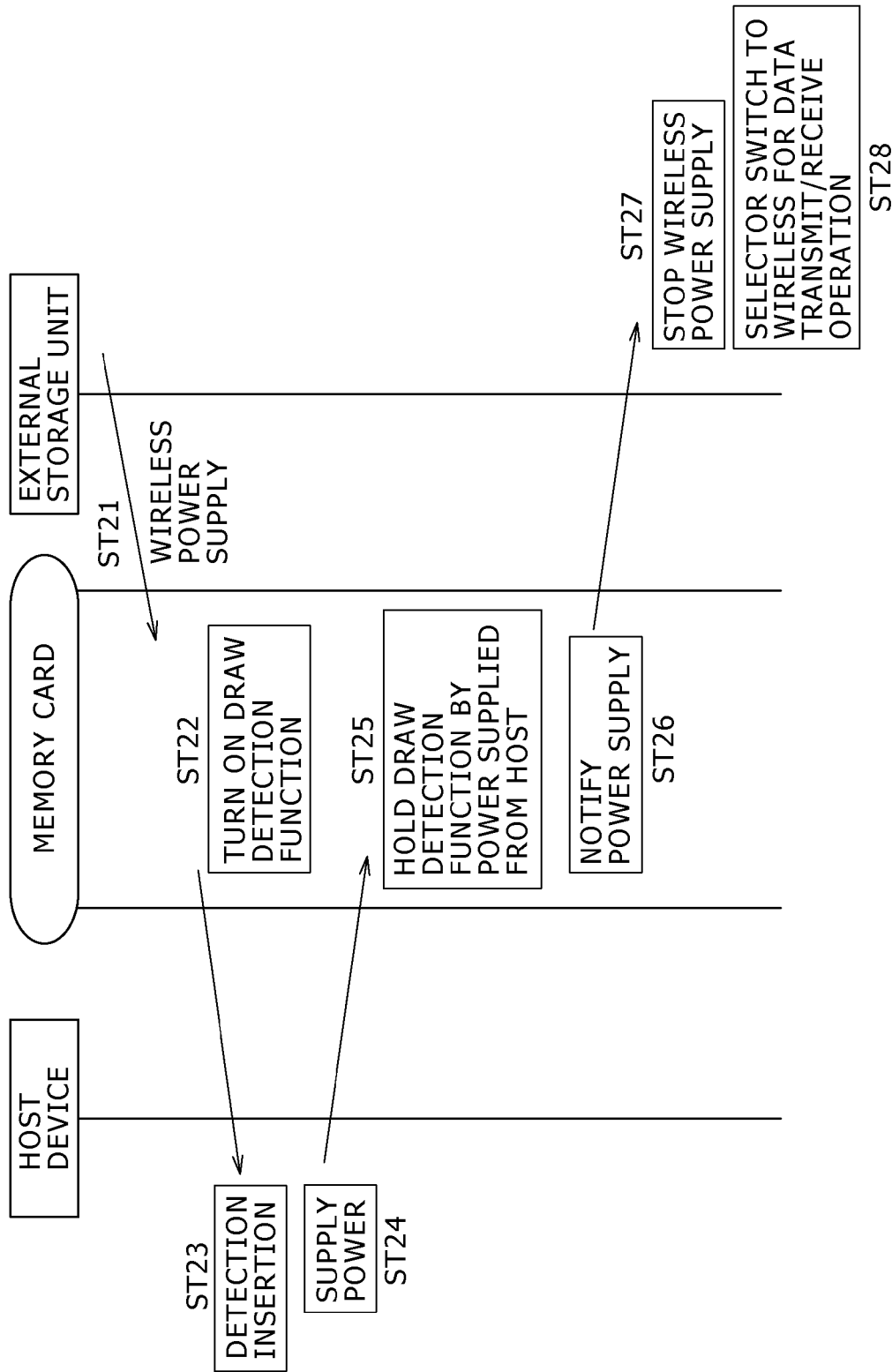
FIG. 19 is a timing chart indicative of a detection operation of a device connection system practiced as the fourth embodiment of the invention.

Referring to FIG. 19, there is shown a timing chart indicative of an detection operation of the device connection system 1 having the memory card 3 and the external storage unit 4 shown in FIG. 18.

When the memory card 3 shown in FIG. 18 is inserted in the host device 2, the input/output port 12, the detection terminal 41, and the power supply terminal 42 are connected to the host device 2.

It should be noted that, at the time when the memory card 3 is inserted in the host device 2, the transistor 51 is controlled in an off state.

Therefore, the potential of the detection terminal 41 is indefinite.

The host device 2 does not detect the memory card 3 inserted in the host device 2.

Then, when the external storage unit 4 is brought close to the memory card 3, the power is supplied from the wireless power supply block 63 of the external storage unit 4 to the wireless power reception block 61 of the memory card 3 (step ST21).

The wireless power supply block 63 outputs a high-level detection signal to the OR circuit 62. The OR circuit 62 outputs a high level to make the transistor 51 be put in an on state. The memory card 3 turns on the load/unload detection function (step ST22).

Consequently, the host device 2 detects the memory card 3 inserted in the host device 2 (step ST23).

Upon detection of the memory card 3, the host device 2 supplies power to the power supply terminal 42 (step ST24). The power supply circuit 43 converts the power supplied from the power supply terminal 42 and supplies the converted power to each component of the memory card 3.

Consequently, the CPU 11, the wireless communication block 13, and so on of the memory card 3 start operating. The CPU 11 functions as the control block 31.

The control block 31 outputs a high-level signal to control the transistor 51 in an on state.

Consequently, if the power supply from the external storage unit 4 to the memory card 3 stops for example, the transistor 51 is maintained in an on state (step ST25).

Outputting the high-level signal, the control block 31 makes the wireless communication block 13 transmit a power supply stop signal (step ST26).

The power supply stop signal is received by the wireless communication block 64 of the external storage unit 4 and entered in the wireless power supply block 63.

The wireless power supply block 63 stops supplying power (step ST27).

The communication state of the external storage unit 4 is switched to the data transmit/receive wireless communication mode (step ST28).

Next, the wireless communication block 13 of the memory card 3 searches for the external storage unit 4.

The wireless communication block 13 communicates with the wireless communication block 64 to detect the external storage unit 4.

The wireless communication block 13 outputs a detection signal to the control block 31 if the external storage unit 4 is detected.

Consequently, the host device 2 with the memory card 3 shown in FIG. 18 inserted can access the external storage unit 4 that wirelessly communicates with the memory card 3.

As described above, in the fourth embodiment, if the memory card 3 is wirelessly powered from the external storage unit 4, the memory card 3 controls the detection terminal 41 in a detected state.

Consequently, if the external storage unit 4 exists in a detectable range of the memory card 3, the memory card 3 is detected by the host device 2.

Each component of the memory card 3 operates on the power supplied from the host device 2 on the basis of the detection of the memory card 3, thereby maintaining the detection terminal 41 in a detected state.

Hence, in the fourth embodiment, the memory card 3 can be detected only when the memory card 3 is in a state communicable with the external storage unit 4.

Further, in the fourth embodiment, upon starting of power supply by the host device 2, the wireless communication function of the memory card 3 starts operating, thereby allowing access to a mate storage device having wireless communication function.

The host device 2 can access the mate storage device having wireless communication function by issuing a storage command.

This configuration allows the fourth embodiment to operate as if a mate storage device having wireless communication function were connected to the host device 2.

(5) The Fifth Embodiment

Configuration of a Device Connection System 1

Figure 20:
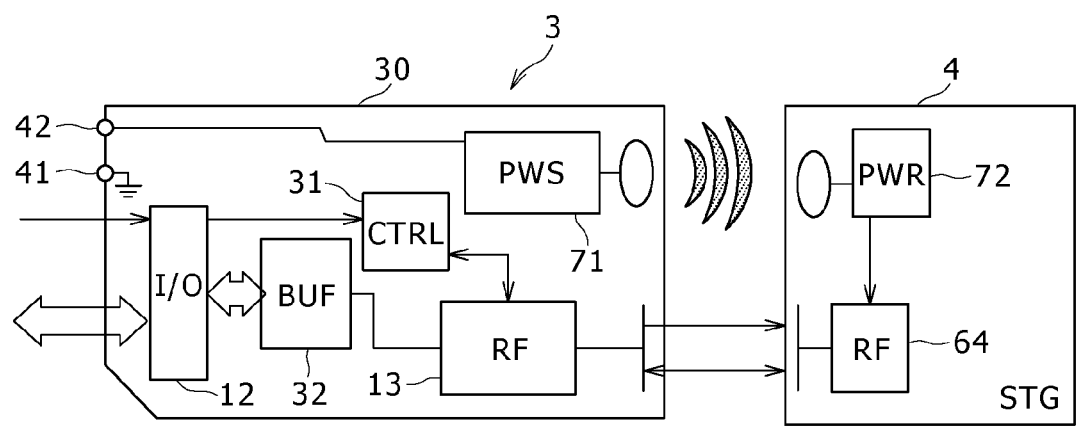
FIG. 20 is a schematic diagram block illustrating a memory card and an external storage unit practiced as a fifth embodiment of the invention.

Referring to FIG. 20, there is shown a schematic diagram illustrating a memory card 3 and an external storage unit 4 practiced as the fifth embodiment of the invention.

The memory card 3 shown in FIG. 20 has a wireless power supply block 71.

With the memory card 3 shown in FIG. 20, a detection terminal 41 thereof is connected to ground.

The external storage unit 4 has a wireless power supply reception block 72.

The wireless power supply reception block 72 operates on the power supplied from the wireless power supply block 71 of the memory card 3.

The configurations of the memory card 3 and the device connection system 1 are substantially the same as those of the fourth embodiment except for the configurational parts mentioned above and therefore the similar components are denoted by the same reference numerals and the description thereof will be skipped.

The wireless power supply block 71 of the memory card 3 is connected to a power supply terminal 42.

The wireless power supply block 71 outputs the power supplied from the memory card 3 through the power supply terminal 42.

The wireless power supply reception block 72 of the external storage unit 4 receives power electromagnetic waves.

The wireless power supply reception block 72 outputs the received power to the wireless communication block 64.

Consequently, the wireless communication block 64 of the external storage unit 4 starts operating.

Operations of the Device Connection System 1

Referring to FIG. 21, there is shown a timing chart indicative of a detection timing of the device connection system 1 having the memory card 3 and the external storage unit 4 shown in FIG. 20.

When the memory card 3 shown in FIG. 20 is inserted in the host device 2, an input/output port 12, a detection terminal 41, and the power supply terminal 42 are connected to the host device 2.

Consequently, the memory card 3 is detected by the host device 2 (step ST31).

The host device 2 supplies power from the power supply terminal 42 (step ST32).

Consequently, each component of the memory card 3 starts operating (step ST33).

A CPU 11, a wireless communication block 13, and so on of the memory card 3 start operating. The CPU 11 functions as a control block 31.

In addition, the wireless power supply block 71 of the memory card 3 starts outputting power (step ST34).

Next, when the external storage unit 4 is positioned inside the detection range of the memory card 3, the wireless power supply reception block 72 of the external storage unit 4 receives power electromagnetic waves output from the memory card 3.

When the wireless communication block 64 of the external storage unit 4 starts operating, the wireless communication block 13 of the memory card 3 detects the external storage unit 4.

Consequently, the host device 2 with the memory card 3 shown in FIG. 20 inserted can access the memory card 3 and the external storage unit 4 by accessing the memory card 3.

Hence, if the host device 2 writes to the memory card 3 (step ST35), for example, the memory card 3 protocol-converts a write request command into a transmit command (step ST36).

Further, the data written by the host device 2 to the memory card 3 is transmitted from the memory card 3 to the external storage unit 4 (step ST37).

As described above, in the fifth embodiment, the memory card 3 has the wireless power supply block 71.

The external storage unit 4 that communicates with the memory card 3 communicates with the memory card 3 by the power supplied from the host device 2 through the wireless power supply block 71.

In addition, because the data transmission and reception between the memory card 3 and the external storage unit 4 by the data transmission and reception wireless communication function is enabled, the host device 2 can access the external storage unit 4 by the same operation as if accessing the memory card 3.

While preferred embodiments of the present invention have been described using specific terms, such description is for illustrative purpose only, and it is to be understood that changes and variations may be made without departing from the spirit or scope of the following claims.

For example, in the embodiments mentioned above, data is transferred between the memory card 3 and the external storage unit 4.

In addition to this configuration, a peripheral device that transfers data with the external storage unit 4 may be one that is a USB (Universal Serial Bus) memory or a portable memory device connectable with the host device 2 and has the wireless communication block 13.

In each of the above-mentioned embodiments, the host device 2 on which the memory card 3 is detachably loaded may be a digital camera, a portable game machine, a mobile phone, or the like. The external storage unit 4 may be a data server, a liquid crystal monitor, a personal computer, or the like.

In addition, the host device 2 may also be a data server, a liquid crystal monitor, a personal computer, a household appliance, or a navigation device, for example.

The external storage unit 4 may also be a digital camera, a portable game machine, a mobile phone, or an automobile, for example.

In each of the above-mentioned embodiments, the host device 2 and the memory card 3 communicates with each other in a wired manner and the memory card 3 and the external storage unit 4 communicate with each other in a wireless manner.

Alternatively, the host device 2 and the memory card 3 may communicate with each other in a wireless manner and the memory card 3 and the external storage unit 4 may communicate with each other in a wired manner.

In each of the above-mentioned embodiments, the host device 2 accesses the memory card 3 only by a storage access command.

Alternatively, the host device 2 may access the memory card 3 by a communication command. This allows the host device 2 to directly communicate with the external storage unit 4 through the memory card 3.

In this case, the host device 2 can also access the external storage unit 4 by use of a storage command to the memory card 3.

In each of the above-mentioned embodiments, the memory card 3 communicates only with the external storage unit 4.

In addition, the memory card 3 may communicate external devices other than the external storage unit 4. These external devices include display monitors, for example.

In communicating with external devices of two or more types as described above, the memory card 3 may determine the types of communicable external devices and, if communication is possible with a storage (the external storage unit 4), allow access to the storage by a storage access command.

Further, the memory card 3 may notify the host device 2 of the type of a detected external device.

The present application contains subject matter related to that disclosed in Japanese Priority Patent Application JP 2009-235276 filed in the Japan Patent Office on Oct. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A peripheral device comprising:
an input/output block that connects to a first device;
a wireless communication block configured to wirelessly communicate with a second device in which data can be stored;
a conversion block configured to convert a storage access command output by said first device to said input/output block into a communication command for a transfer to said second device, the wireless communication block being configured to transmit the communication command to the second device;
a memory configured to store data;
a selector switch block; and
a control block configured to control the selector switch block,
wherein,
the wireless communication block is configured to detect the second device within a communication range of the wireless communication block and to output to the control block (i) a detection signal when the second device is detected within the communication range and (ii) a non-detection signal when the second device is not detected within the communication range, and
the control block (a) controls the selector switch block in response to the detection signal to make the second device accessible by the first device and (b) controls the selector switch block in response to the non-detection signal to make the memory accessible by the first device.

2. The peripheral device according to claim 1, wherein:
the storage access command output by said first device is a write request command to write data and said conversion block converts the write request command into a transmit command to transmit data from said wireless communication block to said second device,
said input/output block outputs a data request signal to said first device in response to said write request command and takes in write data from said first device after outputting said data request signal,
said peripheral device further comprises a buffer memory configured to accumulate the write data input into said input/output block by the first device, and
said wireless communication block transmits said transmit command and the write data accumulated in said buffer memory to said second device.

3. The peripheral device according to claim 1, wherein:
the storage access command output by said first device is a read request command to read data and said conversion block converts the read request command into a receive request command for said wireless communication block to receive data from said second device,
said wireless communication block receives read data from said second device after transmitting said receive request command to said second device,
said peripheral device further comprises a buffer memory configured to accumulate the read data received by said wireless communication block from said second device in a manner in which said received read data is readable by said first, and
when said read data has been accumulated in said buffer memory, said input/output block outputs a ready signal to said first device, the ready signal indicative of the read data being ready for reading.

4. The peripheral device according to claim 1, wherein:
said peripheral device further comprises a power supply terminal configured to receive power from said first device upon detection of a connection of said peripheral device to said first device, and
said wireless communication block operates on the power supplied from said power supply terminal.

5. The peripheral device according claim 1, wherein said peripheral device further comprises a detection terminal configured for said first device to detect a connection of said peripheral device to said first device.

6. The peripheral device according to claim 1, wherein:
said wireless communication block wirelessly transfers data to said second device, and
said peripheral device is a card-type communication device that is inserted into a card slot of said first device.

7. A device connection system comprising:
a first device;
a peripheral device that detachably connects to said first device; and
a second device separate from said first device, the second device being a device in which data can be stored,
said peripheral device having
an input/output block that connects to said first device,
a wireless communication block configured to wirelessly communicate with said second device,
a conversion block configured to convert a storage access command output by said first device to said input/output block into a communication command for a transfer to said second device, the wireless communication block being configured to transmit the communication command to the second device,
a memory configured to store data,
a selector switch block, and
a control block configured to control the selector switch block,
wherein,
the wireless communication block is configured to detect the second device within a communication range of the wireless communication block and to output to the control block (i) a detection signal when the second device is detected within the communication range and (ii) a non-detection signal when the second device is not detected within the communication range, and
the control block (a) controls the selector switch block in response to the detection signal to make the second device accessible by the first device and (b) controls the selector switch block in response to the non-detection signal to make the memory accessible by the first device.

8. The peripheral device according to claim 1, wherein:
the peripheral device further comprises a buffer memory that is readable and writable to by the first device via the input/output block,
the selector switch block connects the wireless communication block to the buffer memory in response to the detection signal, and
the selector switch block connects the memory to the buffer memory in response to the non-detection signal.

9. The peripheral device according to claim 2, wherein:
the selector switch block connects the wireless communication block to the buffer memory in response to the detection signal, and the selector switch block connects the memory to the buffer memory in response to the non-detection signal.

10. The peripheral device according to claim 3, wherein:
the selector switch block connects the wireless communication block to the buffer memory in response to the detection signal, and
the selector switch block connects the memory to the buffer memory in response to the non-detection signal.

11. The peripheral device according to claim 1, wherein the wireless communication block outputs the non-detection signal after a passage of a predetermined time period.

12. The peripheral device according to claim 1, wherein the wireless communication block is further configured to transfer data that is written by said first device to the second device.

13. The peripheral device according to claim 1, wherein the wireless communication block is further configured to transfer data that is read from said second device to said first device.

* * * * *